INVENTOR
THORVALD G. GRANRYD
Paul O. Pippel
ATTORNEY

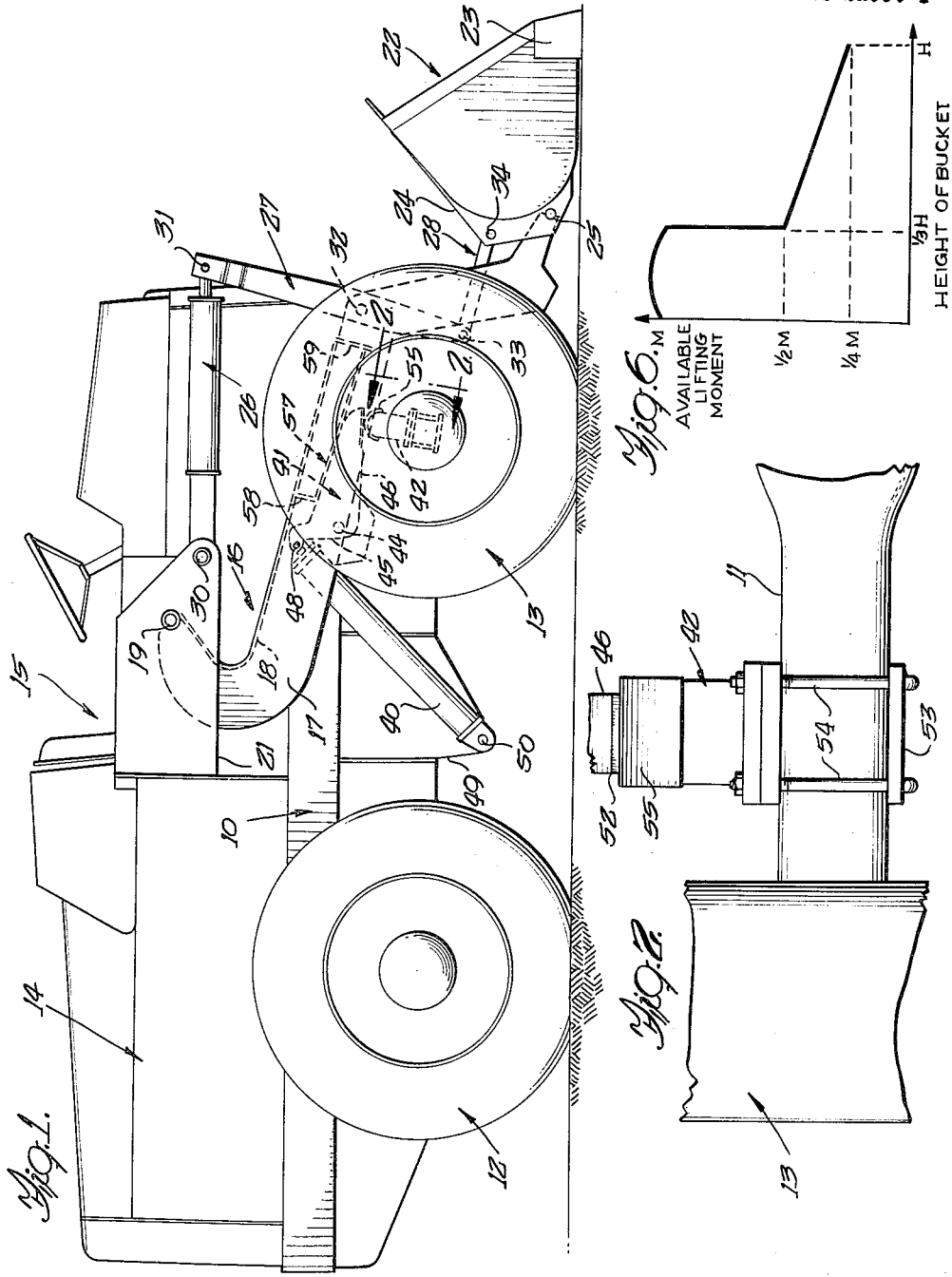

Feb. 27, 1962  T. G. GRANRYD  3,022,911
TRACTOR LOADER BUCKET LIFTING ARRANGEMENT
Filed Nov. 5, 1959  3 Sheets-Sheet 3
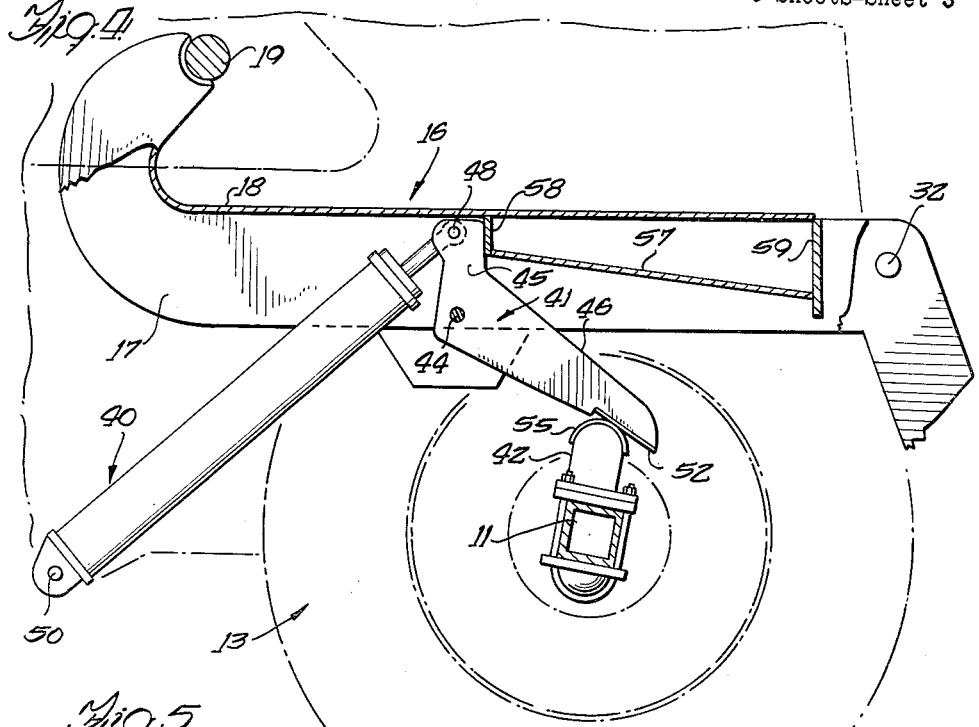
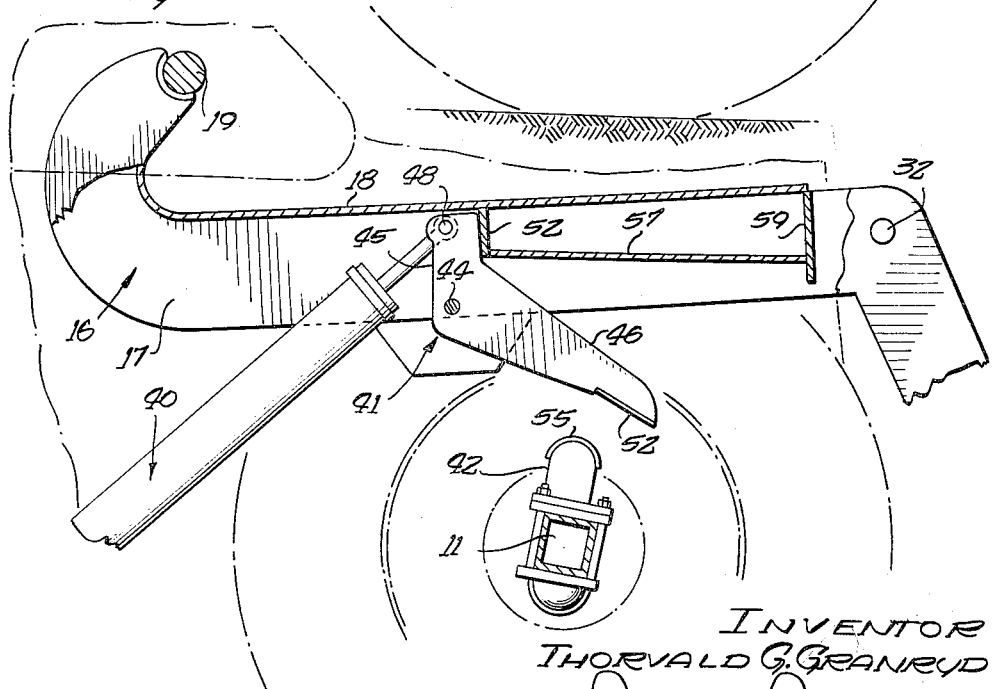
INVENTOR
THORVALD G. GRANRYD
Paul O. Pippel
ATTORNEY

United States Patent Office 3,022,911
Patented Feb. 27, 1962

3,022,911
TRACTOR LOADER BUCKET LIFTING
ARRANGEMENT
Thorvald G. Granryd, Libertyville, Ill., assignor to The
Frank G. Hough Co., a corporation of Illinois
Filed Nov. 5, 1959, Ser. No. 851,187
9 Claims. (Cl. 214—140)

This invention relates generally to tractor loaders, and more specifically to an improved lifting arrangement for the boom of a front end type tractor loader.

Front end type tractor loaders, as commonly known in the art, generally comprise a tractor of the four wheeled rubber tired type, having a boom assembly pivotally carried thereon and extending forwardly of the tractor, with the forward end of the boom carrying a digging bucket thereon. Certain linkage means connected between the tractor, the boom, and the digging bucket, provide for the various operative positions of the bucket. Generally the boom which comprises duplicate portions on each side of the tractor is raised and lowered by the use of a pair of hydraulic motors or rams disposed one on each side of the tractor for each portion of the boom. Generally each of these hydraulic motors is pivotally connected between the frame of the tractor and the boom intermediate the ends thereof so that upon extension of the hydraulic rams the forward end of the boom is raised and upon retraction thereof a lowering occurs. Further, generally digging occurs with the boom in its lowermost position and with the bucket disposed substantially horizontally for digging at ground level. The tractor is then moved forwardly forcing the forward cutting edge of the bucket into the material to be worked. The loaded bucket must then be separated from the remainder of the material to be worked and raised to a carrying or dumping position. At this portion of the operative cycle of these tractor loaders, that of having to completely fill and break the loaded bucket away from the remaining material, produces substantially the greatest loading upon the hydraulic system as compared to any other portion of the cycles of operation of the machine. And often times insufficient forces are produced for performing this function. A number of attempts have been made in the art to substantially increase the break-out force for a tractor loader, however, generally these have been cumbersome and expensive.

A further facet of this problem is introduced by the more powerful engines and drive lines being present'y developed and used in tractors for loaders. A common occurrence in present day uses of these machines is the projection of the bucket into a difficult material with the further application of hydraulic and tractive power by the operator to cause the rear wheels of the tractors to be lifted off of the ground and simultaneously causing the front wheels to skid as the frictional resistance between the tires and the ground is overcome. At this point the power of the engine is substantially consumed in the production of heat between the front tires and the ground. A simple solution to this problem is complicated by various factors which are believed to be important. Firstly, considering the vertical range of the bucket, the increment thereof of generally difficult digging conditions is approximately the first third of the range measured from the ground. Secondly, standards of tractor construction and operator placement complicate the desirable direction of the force produced by the boom lifting rams along lines substantially tangential to the boom pivoting arc. Thirdly, it is desirable that the boom lifting rams not be excessively long to provide adequate ground clearance, and yet be long enough to provide a rather large travel arc for the boom and bucket so that dumping into relatively high truck bodies or bins may be accomplished. Further, it is desirable that the various speeds of operation be such that after the digging operation, the bucket may be raised to a carrying or a dumping position relatively rapidly. These various requirements may be shown in the form of a graph such as shown in FIGURE 6. The displayed available lifting moment-height of bucket curve is one that is considered satisfactory and it is the object of the present invention to produce a boom lifting arrangement in a front end type tractor loader which will operate in such a manner.

It is a further object of the present invention to provide means for substantially increasing the initial raising force on the boom of a front end type tractor loader.

A further object of the present invention is to provide a lifting arrangement for the boom of a front end type tractor loader wherein substantially the maximum available boom lifting moment will be used during the first portion of the lifting movement of the bucket, and wherein thereafter the bucket will be further raised through a force-speed arrangement providing more rapid raising at a lower applied force.

A further object of the present invention is to provide a bucket lifting arrangement for use in the digging of difficult materials which will minimize the possibility of the rearward end of the tractor being raised from the ground and of the front wheels skidding in the digging operation.

It is a further object of the present invention to provide a leverage arrangement between the boom raising rams and the boom of a front end type tractor loader and utilizing the front axle housing as a reaction member for the leverage arrangement.

It is a further object of the present invention to provide a simple arrangement such as described in the immediately preceding paragraph wherein the portion of the lifting cycle after the initial portion, or approximately the first third thereof, is performed independently of the initial lifting arrangement and wherein the force vectors throughout the lifting cycle lie substantially on tangents to the lifting arc of the boom.

Other objects and features of the present invention will be apparent, as will a clearer understanding of the principles involved in the present invention, upon a perusal of the following specification and drawings of which:

FIGURE 1 is a side elevational view of a tractor loader constructed according to the present invention;

FIGURE 2 is an enlarged partial view of the structure shown in FIGURE 1 and taken along the line 2—2 of FIGURE 1;

FIGURES 4 and 5 are further views similar to FIGURE 3 showing two different operated positions of the present invention; and FIGURE 6 is a graph showing the approximate proportions of the various moments available during the lifting cycle of the present invention.

Figure 3:
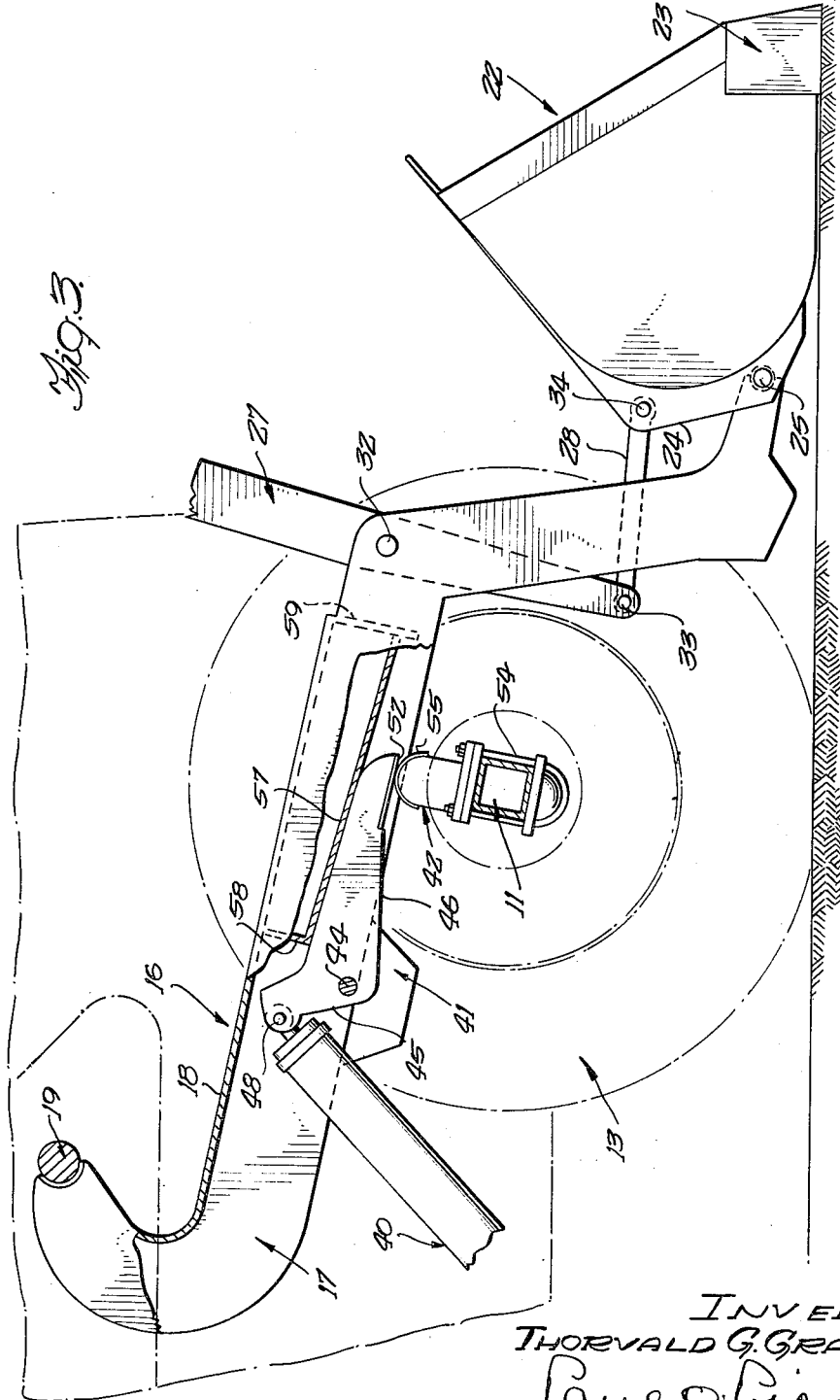
FIGURE 3 is an enlarged partial cross sectional view of the structure shown in FIGURE 1.

The present embodiment is the preferred but it is to be understood that changes can be made in the present embodiment by one skilled in the art without departing from the spirit and scope of the present invention.

For a general description of the present invention reference is made to the drawings. The tractor is provided with a somewhat S-shaped boom which is pivotally mounted on the upper portion thereof adjacent the operator's compartment, a somewhat conventional location. The boom extends forwardly of the tractor and carries a bucket on the forward end thereof. Certain linkage means connected between the tractor, the boom and the bucket provides for tilting of the bucket about its pivotal axis on the boom. The boom is formed in duplicate portions disposed on each side of the tractor and a pair of hydraulic rams are provided for raising and lowering each portion of the boom. These hydraulic rams are connected at one end thereof to the frame of the tractor and at the other end thereof to a second class lever arrangement. The lever is pivotally connected intermediate its ends on the boom intermediate the ends thereof. One end of the lever engages a pad carried on the upper side of the front axle housing and the other end of the lever is pivotally connected to the boom raising ram. The pivot axes of the boom on the tractor, the boom raising rams on the tractor, the lever on the boom, and the relative lengths of the boom, the boom raising rams, and the lever, are so cooperatively positioned and sized that the bucket may be raised through a difficult material during approximately the first third of the lifting cycle with a substantially great force, which force is applied substantially tangentially to the arc of the boom in raising and lowering throughout substantially the entire lifting cycle.

For a detailed description of the present invention continued reference is made to the drawings. The tractor comprises a chassis or frame 10 carried on front and rear axle housings, the forward of which is designated with the numeral 11 which axle housings in turn are supported by the rearward wheels 12 and the forward wheels 13. The tractor further comprises an engine compartment 14 disposed on the rearward portion thereof and a forwardly disposed operator's compartment 15.

The boom 16 is formed of duplicate portions disposed one on each side of the tractor, and each portion or boom arm comprises a pair of spaced apart somewhat S-shaped plates 17 rigidly interconnected by transverse plates such as 18. The rearward end of each portion of the boom is pivotally carried on the tractor at each side of the operator's compartment 15 and is pivotally supported by pin means 19 carried between the side of the tractor and a plate 21. The boom 16 extends forwardly of the tractor over the front axle housing 11 and between the body of the tractor and the front wheels 13.

The bucket 22, which may be of any shape known in the art, comprises a pair of spaced apart side walls interconnected by a rear and a bottom wall. A cutting edge 23 is secured to the forward marginal edge of the bottom wall and extends upwardly a short distance along the forward marginal edges of the side walls thereof. The rear wall of the bucket has a plurality of flanges such as flange 24 mounted thereon and extending rearwardly thereof. The forward end of each portion of the boom 16 is pivotally connected to the flanges 24 of the bucket by pin means 25. Pin means 25 are positioned substantially at the lower end of the flanges 24.

The means for pivoting the bucket 22 relative to the boom 16 comprises a hydraulic ram 26, a lever 27 and a link 28 formed in duplicate portions for each side of the tractor. Each hydraulic ram 26 is pivotally carried at the head end thereof on the tractor by means of pin means 30 positioned between the side walls of the tractor and the plate 21. The rod end of the hydraulic ram 26 is pivotally connected to one end of lever 27 by pin means 31. The lever 27 is pivotally connected intermediate its ends between the plates 17 of one of the boom arms by pin means 32. The other end of each lever 27 is pivotally connected to one end of one of the links 28 by pin means 33. The other end of each link 28 is pivotally connected to the flanges 24 by pin means 34. Pin means 34 is positioned substantially above pin means 25. It thus may be seen that if the hydraulic rams 26 are retracted the bucket will be pivoted in a clockwise direction, as viewed in FIGURE 1, through the levers 27 and links 28, and will be pivoted counterclockwise by extensions of the hydraulic rams 26. Extensions of the hydraulic ram 26 are used to properly position the bucket for cutting and to pivot the bucket rearwardly to break away and carry a loaded bucket from the material being worked, and retractions of the bucket are used in the dumping operation. The pin means 30 is positioned forwardly and below the pin means 19 so that when the bucket 22 is pivoted rearwardly to the breakout position, substantially a parallelogram is defined which will automatically maintain the bucket in a good load retention position as the boom is being raised.

The means for raising and lowering the boom comprises a pair of hydraulic rams 40, a pair of levers 41, and a pair of pads 42, one of each pair being associated with each boom arm. Describing the arrangement for one boom arm should suffice for both sides. The lever 41 is formed slightly as a bellcrank with the junction of the arms 45 and 46 being pivotally carried between the plates 17 by a pin 44. Arm 45 is shorter than arm 46 and is pivotally connected at the end thereof to the rod end of the hydraulic ram 40 by pin means 48. The head end of the hydraulic ram 40 is pivotally connected by pin means 50, to a bracket 49 depending from the frame 10. The underside of the outer end of the arm 46 of lever 41 is provided with a wear plate 52 which in the lowered position of the boom rests upon the pad 42. The pad 42 is secured to the axle housing 11 by a bracket 53 and bolts 54. The pad 42 upstands from the axle housing 11 and is tilted forwardly of the tractor a slight amount. The upper surface of the pad 42 is curved to permit relatively easy sliding of the arm 46 thereover as the boom is raised. The upper surface of the pad 42 is provided with a wear plate 55. The wear plates 52 and 55 may be of any suitable material known in the art such as a hardened steel and may be secured thereon by any common means permitting easy removal and replacement thereof. The lever 41 further cooperates with a stop arrangement which comprises a box-like member secured between the panels 17 of the boom 16. This box-like stop arrangement comprises a bottom wall 57 and end walls 58 and 59. Wall 57 is secured between the panels or plates 17 in a substantially horizontal plane and wall 58 is secured to the rearward end of wall 57 and below plate 18 and between panels 17. Wall 59 is secured between plates 17, below 18 and to the forward end of bottom wall 57. When the boom 16 is in its lowermost position such as shown in FIGURE 1, the bottom wall 57 rests upon the upper surface of arm 46 of lever 41 which in turn rests upon the pad 42, as may be easily seen in FIGURE 3. When the lever 41 has been pivoted to raise the boom 16 through approximately the first third of its lifting cycle, the upper surface of the arm 45 of the lever 41 will engage the wall 58 such as shown in FIGURES 4 and 6.

The length of the various members and the size of the hydraulic rams 40 must be correlated to the size of the tractor to provide an action such as shown in FIGURE 6. Although there can be some variance therefrom, a good arrangement is one wherein the available lifting moment during the first third of the lifting cycle of the boom is roughly twice that available during the remainder of the lifting cycle. Generally once the bucket is moved through the first third of its lifting cycle, sufficient freedom from the material being worked is achieved so that a substantially smaller force is required to merely raise the bucket to its full dumping height. During the upper two thirds of the lifting cycle of the bucket, the available lifting moment will gradually decrease by about one-half as the moment arm measured along a line extending from pin 19 perpendicularly to the line of force of the hydraulic rams 40 becomes smaller and smaller.

Before turning to a description of the operation of the present invention in order that the construction thereof may be more readily understood, it should be noted that any suitable hydraulic fluid pumps, valves and conduits (not shown) may be connected to the hydraulic rams 26 and 40 for selective operation thereof by the operator of the tractor loader.

In considering the operation of the present invention, it may be seen from FIGURE 1 that as the hydraulic rams 40 are initially extended to apply a force on the arm 45 of the lever 41, with the arm 46 reacting against the pad 42, the vectorial sum or the resultant force will be in a direction more closely tangential to the arc of boom pivoting about pin 19 than is the directional vector of the force applied by the hydraulic rams 40. This is due to the direction of the vector of the reaction of the pad 42 which is directed substantially vertically upwardly. When the hydraulic rams 40 are substantially completely retracted, the bucket is securely braced on the front axle housing 11 through the plate 57 carried by the boom resting upon the arm 46 which in turn rests upon the pad 42 carried on the axle housing 11. Since the effective moment arm of the arm 46 is longer than the effective moment arm of the arm 45, the length of the hydraulic rams 40 is maintained relatively short. If the length of the effective moment arm of arm 46 relative to arm 45 is increased, a longer ram 40 is necessary in order to maintain substantially the same high lift dump position. There is a limit to the length of the hydraulic rams 40 since ground clearance beneath the lower end of the rams 40 must be provided. Maintaining a certain ground clearance but moving the pin 50 rearwardly of the tractor to increase the length of the rams 40 operates to a disadvantage since the applied force of the rams 40 is then directed further away from tangents to the arc of travel of the boom 16 about pins 19. The length of the boom 16 and the location of the pins 19 must also be considered for when carrying a load it is desirable to position the loaded bucket as close as possible to the forward end of the tractor to minimize the necessary counterweight at the rear end of the tractor. Further, it is desirable to keep the pins 19 located substantially forwardly of the tractor to provide for operator safety, for as the pins 19 are moved rearwardly a greater tendency to produce a scissor's action between the boom and the sides of the operator's compartment occurs. If these various considerations are kept in mind, it will be apparent that the subject invention provides a unique solution to the problem of using the maximum available lifting moments throughout the entire lifting cycle of a front end type tractor-loader.

FIGURE 4 shows the manner in which the lever 41 is moved during the first third of the lifting cycle and a consideration of the force vectors therein discloses a substantially efficient arrangement. When the upper side of the arm 45 of the lever 41 engages the plate 59 such as shown in FIGURE 4, further extensions of the hydraulic rams 40 will raise the arm 46 from the pad 42. During the upper two-thirds of the lifting cycle, that wherein the loading on the tractor is substantially less than during the first third, lifting may proceed at a greater speed and lower applied force. As the boom is raised above positions such as shown in FIGURES 4 and 5, the direction of the applied force of the hydraulic rams 40 is not greatly changed from the substantial tangential direction to the arc of the boom occurring when the arm 46 of lever 41 engages the pad 42 since the rams 40 are tilted upwardly toward pins 19 as the boom is thusly raised.

The operation of the linkage means need only be described briefly as other linkage means may also be used with the present invention. When the hydraulic rams 26 are extended, the lever 27 is pivoted in a clockwise direction as seen in FIGURE 1 about pin 32 and the bucket 22 is tilted rearwardly by links 28. When the boom has been raised, a complete retraction of hydraulic rams 26 will cause a dumping of the bucket 22 through the counterclockwise pivoting of lever 27 and the clockwise pivoting of the bucket 22 to the dump position.

From the above description it may be seen that the present invention provides a unique loader arrangement which may be effectively used under operating conditions wherein the bucket 22 has been forced into a pile of difficult material, and the hydraulic rams 40 are applying a lifting force to the boom 16 tending to raise the rear wheels and skid the driven front wheels, and under operating conditions wherein once the bucket has been raised past the initial portion of the lifting cycle, and the conditions of wheel skidding or raising of the rearward end of the tractor have ceased, a substantially rapid raising of the boom 16 may occur.

Having described the present invention, what is considered new and desired to be protected by Letters Patent is:

1. In a tractor loader, a boom and bucket lifting arrangement comprising a boom pivotally connected to the tractor and extending forwardly thereof, a bucket operatively carried on the forward end of said boom, a lever pivotally carried intermediate its ends on said boom intermediate the ends thereof, a double acting hydraulic ram pivotally connected at one end thereof to said tractor substantially below the pivotal connection of said boom on said tractor, means pivotally connecting the other end of said ram to one end of said lever, pad means carried on a portion of said tractor, the other end of said lever being formed to engage said pad means during the initial portion of the lifting cycle of said boom and bucket, and stop means carried on said boom and being formed to engage said other end of said lever on the substantially complete retraction of said ram to hold said boom against said pad means.

2. In a tractor loader wherein the tractor comprises a pair of forward wheels supporting an axle housing which in turn supports the forward end of the tractor, a boom and bucket lifting arrangement comprising a boom pivotally connected to the tractor and extending forwardly thereof over the front axle housing, a bucket operatively carried on the forward end of said boom, a lever pivotally carried intermediate its ends on said boom intermediate the ends thereof, a hydraulic ram pivotally connected at one end thereof to said tractor substantially below the pivotal connection of said boom on said tractor, means pivotally connecting the other end of said ram to one end of said lever, pad means carried on said axle housing on the upper side thereof, the other end of said lever being formed to engage said pad means during the initial portion of the lifting cycle of said boom and bucket.

3. In a tractor loader wherein the tractor comprises a pair of forward wheels supporting an axle housing which in turn supports the forward end of the tractor, a boom and bucket lifting arrangement comprising a boom pivotally connected to the tractor and extending forwardly thereof over the front axle housing, a bucket operatively carried on the forward end of said boom, a lever comprising first and second lever arms, pin means pivotally carrying said lever at the junction of said first and second arms on said boom intermediate the ends thereof and rearwardly of said front axle housing, a hydraulic ram pivotally connected at one end thereof to said tractor substantially below the pivotal connection of said boom on said tractor, means pivotally connecting the other end of said ram to the end of said first arm, pad means carried on said axle housing on the upper side thereof, the under side of said second arm being formed to engage the upper surface of said pad means during the initial portion of the lifting cycle of said boom and bucket.

4. In a tractor loader wherein the tractor comprises a pair of forward wheels supporting an axle housing which in turn supports the forward end of the tractor, a bucket lifting arrangement comprising a boom pivotally connected to the tractor and extending forwardly thereof over the front axle housing, a bucket operatively carried on the forward end of said boom, a lever comprising first and second lever arms, pin means pivotally carrying said lever at the junction of said first and second arms on said boom intermediate the ends thereof and rearwardly of said front axle housing, a hydraulic ram pivotally connected at one end thereof to said tractor substantially below the pivotal connection of said boom on said tractor, means pivotally connecting the other end of said ram to the end of said first arm, pad means carried on said axle housing on the upper side thereof, the underside of said second arm being formed to engage the upper surface of said pad means during the intial portion of the lifting cycle of said boom and bucket, stop means carried on said boom and formed to engage the upper surface of said second arm when the boom is in the lowermost position, a second stop means carried on said boom and positioned to engage the upper side of said first arm when said boom has been raised through substantially one-third of the lifting cycle of said boom and bucket.

5. In a tractor loader wherein the tractor comprises a pair of forward wheels supporting an axle housing which in turn supports the forward end of the tractor, a boom and bucket lifting arrangement comprising a boom formed of a pair of duplicate boom arms disposed one on each side of said tractor, each of said boo marms being pivotally connected to said tractor on one side thereof and extending forwardly thereof over the front axle housing and between said forward wheels and the body of said tractor, a bucket operatively carried on the forward end of said boom arms, a pair of levers, each of said levers comprising first and second lever arms, pin means pivotally carrying each of said levers at the junction of the first and second arms thereof on one of said boom arms intermediate the ends thereof and rearwardly of said front axle housing, a pair of hydraulic rams, each of said hydraulic rams pivotally connected at one end thereof on one side of said tractor and substantially below the pivotal connection of said boom arms on said tractor, means pivotally connecting the other end of each of said rams to the end of one of said first arms, pad means carried on said axle housing on each side of said tractor between said forward wheels, the underside of each of said second arms being formed to engage the upper surface of said pad means on each side of said tractor during the initial portion of the lifting cycle of said boom and bucket.

6. In a tractor loader as claimed in claim 5 wherein each of said boom arms is formed of a pair of vertical plates secured in a horizontally spaced-apart relationship to each other, and wherein said pin means pivotally carries each of said levers between said plates of one of said boom arms.

7. In a tractor loader as claimed in claim 6 wherein stop means is provided for each of said levers, said stop means comprising a first plate member secured between said plates of said boom arms in a substantially horizontal plane and positioned to engage the upper surface of said second arm when said boom is in the lowermost position, and a second plate member secured between said plates of said boom arms in a substantially vertical plane at a position to that the upper side of said first lever engages said second plate member when the boom and bucket have been raised through substantially one-third of the lifting cycle of said boom and bucket.

8. In a tractor loader wherein the tractor comprises a pair of forward wheels supporting an axle housing which in turn supports the forward end of the tractor, a bucket lifting arrangement comprising a boom pivotally connected to the tractor substantially at the upper portion thereof and extending forwardly thereof over the front axle housing, a bucket operatively carried on the forward end of said boom, a lever comprising first and second lever arms, said second lever arm being substantially longer than said first lever arm, pin means pivotally carrying said lever at the junction of said first and second arms on said boom intermediate the ends thereof and rearwardly of said front axle housing, a hydraulic ram pivotally connected at one end thereof to said tractor substantially below and rearwardly of the pivotal connection of said boom on said tractor, means pivotally connecting the other end of said ram to the end of said first arm, pad means carried on said axle housing on the upper side thereof, said pin means being further positioned on said boom and said hydraulic ram having a length so that when said hydraulic ram is substantially completely retracted, the underside of the end portion of said second arm engages the upper surface of said pad means during the initial portion of the lifting cycle of said boom and bucket.

9. A boom arm construction for a front wheel driven tractor loader, comprising a pair of vertically disposed horizontally spaced boom plates, means at one end of said plates for pivotally mounting the boom arm on a tractor, means at the other end of said boom arm for pivotally connecting a bucket thereto, a lever comprising first and second lever arms, pin means pivotally mounting said lever at the junction of said first and second arms between said boom plates intermediate the ends thereof, with said lever arms disposed substantially longitudinally of said boom plates, said boom arm having a horizontal thickness sufficient to permit free movement of said boom arm between the side walls of a tractor and the inner sides of the forward wheels, said boom plates being spaced-apart a distance to permit the entrance of one end of a boom raising and lowering hydraulic ram therebetween, the end of said first lever arm being adapted for pivotal connection to a boom raising and lowering ram, the underside of the end portion of said second arm being adapted for engagement with a fulcrum carried on the axle housing of a tractor loader between the forward wheels and the side of said tractor, and a first stop plate secured between the inner walls of said boom plates substantially in a horizontal plane and at a position to engage the upper side of said second lever arm, a second stop plate secured between the inner walls of said boom plates and at the rearward end of said first stop plate, said second stop plate positioned in a substantially vertical plane to engage the upper side of said first lever arm after pivotal movement of said lever through a certain angle.

References Cited in the file of this patent
UNITED STATES PATENTS

| | | |
|---|---|---|
| 2,440,765 | Acton | May 4, 1948 |